United States Patent [19]

Banaszak

[11] Patent Number: 5,109,228
[45] Date of Patent: Apr. 28, 1992

[54] METHOD AND DEVICE FOR THE TRANSMISSION AND RECORDING OF DIGITALLY ENCODED MESSAGES

[75] Inventor: Jean M. Banaszak, Gennevilliers, France

[73] Assignee: Thomson CSF, Puteaux, France

[21] Appl. No.: 493,754

[22] Filed: Mar. 15, 1990

[30] Foreign Application Priority Data

Mar. 17, 1989 [FR] France .................. 89 03532

[51] Int. Cl.⁵ .................................. H03M 11/02
[52] U.S. Cl. .................................. 341/175; 341/22; 341/28; 341/176; 340/711; 364/516; 358/108
[58] Field of Search .............. 341/175, 28, 21, 23, 341/22, 176, 191; 340/711; 178/17 C; 358/108; 364/514, 516

[56] References Cited

U.S. PATENT DOCUMENTS 4,546,435 10/1985 Herbert et al. ............. 364/200
4,684,926 8/1987 Yong-Min ..................... 341/28
4,696,492 9/1987 Hardin ........................ 283/45
4,763,291 8/1988 Schwaber ..................... 340/711
4,971,406 11/1990 Hanson ........................ 340/711

Primary Examiner—Donald J. Yusko
Assistant Examiner—Michael Horabik
Attorney, Agent, or Firm—Cushman, Darby & Cushman

[57] ABSTRACT

Observers in the theater of operations use remote units to encode and transmit messages characterizing multiple events observed in theater of operations. The messages are composed from a predefined set of symbolic ideograms, representing and describing actions or objects likely to occur in the theater of operations. A central control center receives the multiple incoming transmissions. The messages are decoded and processed to produce a holistic accumulation of the various observations. According to one embodiment, the accumulation might graphically recompose theater activity according to correlated data received from the observers.

6 Claims, 6 Drawing Sheets

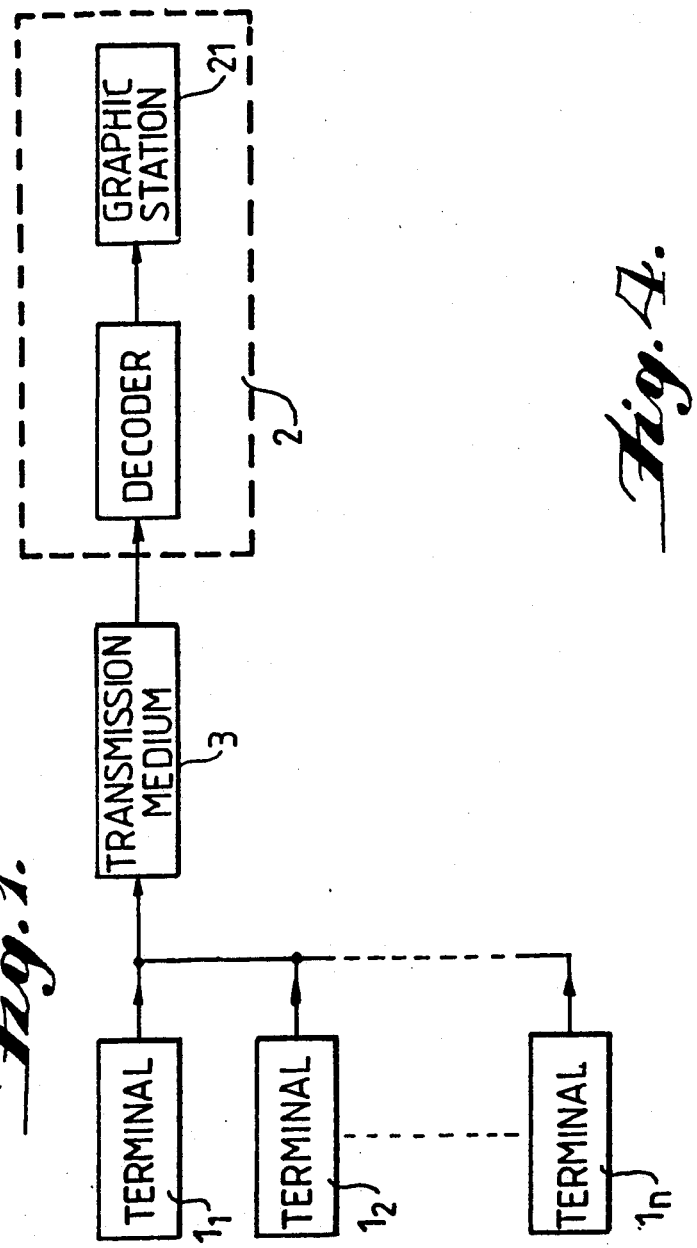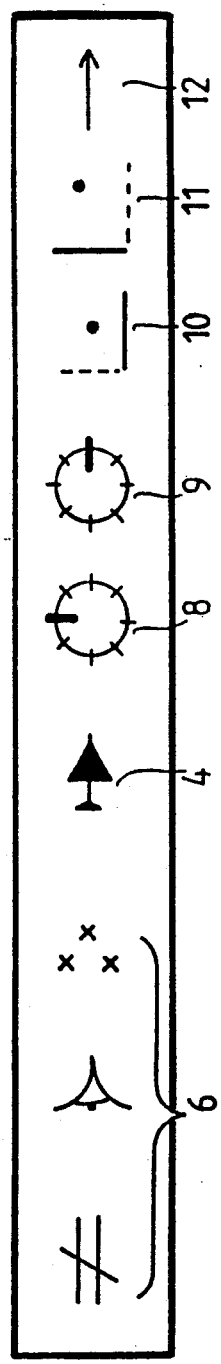

| MEANING | SYMBOL | MEANING | SYMBOL | | |
|---|---|---|---|---|---|
| same object | = | south | ↓ | ↙ | ✶ |
| different object | ≠ | south/west | | | ✶ |
| I see | ⊳ | west | ⊙ | ← | ✶ |
| I hear | ( | north/west | | ↖ | ✶ |
| Quantity | | above | ↓ | = | ✶ |
| 1 | × | Direction of movement | | | |
| 2 | ×× | north | | ↑ | ✶ |
| 3 | ××× | north/east | | ↗ | ✶ |
| group | ××× ×× | east | | → | ✶ |
| Type | | south/east | ⊙ | ↘ | ✶ |
| Military aircraft | ✈ | south | | ↓ | ✶ |
| Transport aircraft | ✈ | south/west | | ↙ | ✶ |
| Helicopter | 🚁 | west | | ← | ✶ |
| Commercial aircraft | ✈ | north/west | | ↖ | ✶ |
| Light civilian aircraft | ✈ | zero | | = | ✶ |
| Miscellaneous | ⬡ | Altitude | | | |
| Position | Keys | Screen | zero | — | ⌐ |
| North | ↑ | ↑ | ✶ | low | ⌐ |
| north/east | ⊙ | ↗ | ✶ | medium | ⌐ |
| east | | → | ✶ | high | ⌐ |
| south/east | ↓ | ↘ | ✶ | Distance | |

| Meaning | Symbol | | Meaning | Symbol | |
|---|---|---|---|---|---|
| | | | | Keys | Screen |
| Speed | | | Transmission channel | ᏕᎨ | $C_1$ $C_2$ $C_3$ $C_4$ |
| Stopped | = | | 1 | | |
| Slow | ↑ | | 2 | | |
| Fast | ↑↑ | | 3 | | |
| | | | 4 | | |
| Good reception | ᏕᏕ | | Display the last message received | ᏕᏕ | |
| Poor reception | ᏕᏕ ✗ | | | | |
| Danger | △! | | Display the last message composed | ▭ | |
| Yes | ↵ | | | | |
| No | ✗ | | Erase the message being composed | ⌿ | |
| Transmission | TX ᏕᏕ | | | | |

12 — 14 — 15 — 16 — 17 — 18

METHOD AND DEVICE FOR THE TRANSMISSION AND RECORDING OF DIGITALLY ENCODED MESSAGES

BACKGROUND OF THE INVENTION

Field of the Invention

The present invention concerns a method and a device for the transmission and recording of digitally encoded messages. It can be applied notably to the transmission of very short operational messages enabling persons, who are geographically far from the place where events are taking place, to have immediate knowledge of the nature and, if necessary, of the seriousness of these events. Operational messages are commonly transmitted in the form of digital data by means of a wide variety of information transmission media such as, for example, heavy or light portable radio transmitter/receiver sets or again telephone lines, by means of alphanumerical terminals.

However, these media lose some of their efficiency when the transmission takes place in conditions that are uncomfortable for the operator, or again when several events take place almost simultaneously at a given instant. For, in these cases, the time needed to take a situation into account may become excessively great, either because the operator reacts too slowly to formulate the event or events witnessed by him or because he is forced by physical pressures to momentarily interrupt his formulation or, again, because of the complexity involved in putting the transmission media into use.

SUMMARY OF THE INVENTION

An aim of the invention is to overcome the above-mentioned drawbacks.

To this effect, an object of the invention is a method for the digital transmission and the recording of digitally encoded operational messages comprising the steps of:

selecting, among symbols or ideograms representing actions or objects of a theater of operations, those capable of providing information on the status of determined situations observed in the theater of operations, composing the different fields of the messages by the juxtaposition of the selected symbols in the suitable order to describe each type of observed situation, almost simultaneously encoding and transmitting each composed message, it being possible for each message to be transmitted at and instant, irrespectively of the status of information provided by the different fields constituting the message and irrespectively of the order in which they provide the information.

It is another object of the invention to provide devices for the implementation of the above-mentioned method.

In addition to enabling very fast acquisition of data on operational situations, the invention also has the advantage of offering a universal language of communication that is very simple to learn.

BRIEF DESCRIPTION OF THE DRAWINGS

Other characteristics and advantages of the invention shall appear here below from the following description, made with reference to the appended drawings, of which:

FIG. 1 the organization of a system of data transmission described by means of ideograms according to the invention;

FIGS. 3a and 3b show the meaning of the symbols engraved on the keyboard of a terminal;

FIG. 4 shows an example of the composition of messages;

DESCRIPTION OF THE PREFERRED EMBODIMENTS

The system according to the invention, shown in FIG. 1, has several information transmitting terminals $1_1$ to $1_N$, coupled to a control center 2 shown inside a closed dotted line. A transmission medium 3, formed by any known transmission device of the radio or telephone type, provides for the conveying of the information transmitted by each terminal $1_1 - 1_N$. Each terminal $1_1$ to $1_N$ is entrusted, in the operation of the system, to an operator or look-out man who has the task of observing the scene of the theater of operations in which he is placed and of informing the control center 2 of the events that occur therein. According to the invention, instead of using an alphanumerical keyboard to transmit his messages in plain language, the observer uses a symbolic keyboard structure of the type shown in FIG. 2 where, unlike in the alphanumerical keyboard, each key 5 is associated not with a letter of an alphabet or a number of a numeration system but with a symbol or ideogram representing an object or an action chosen from among a class of objects or actions that the operator is liable to identify in the scene that he observes, or of actions that he is himself in the process of performing.

Figure 2:
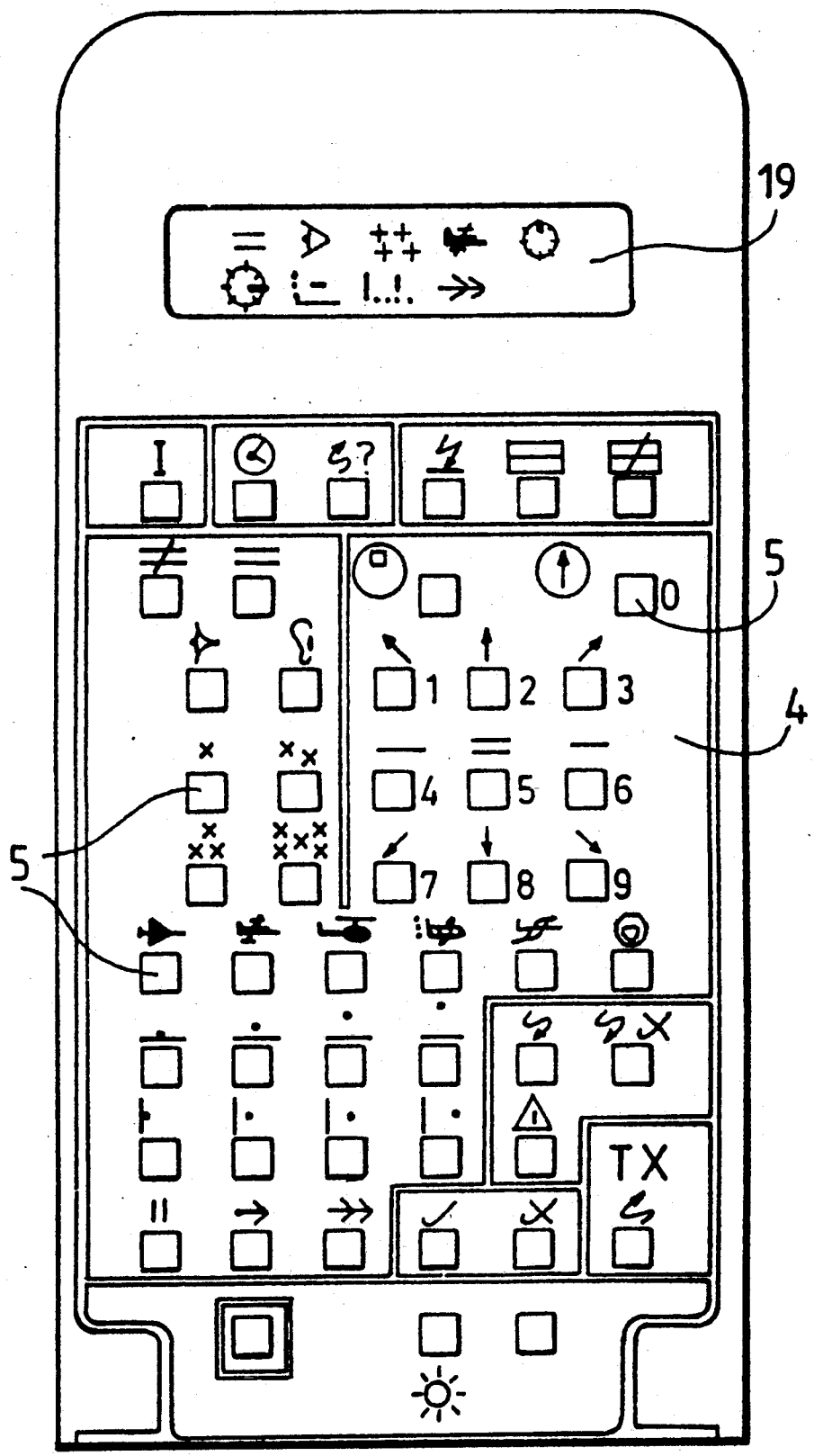
FIG. 2 shows the organization of a terminal keyboard that can be used to compose messages according to the invention.

In the example of FIG. 2, the keyboard has symbols that are more particularly adapted to the descriptions of situations in the air, and their meaning is indicated in the tables shown in FIGS. 3a and 3b.

For ergonomical reasons, the keyboard is divided into several zones containing the symbols and the corresponding keys necessary, firstly, for the constitution of operational messages and, secondly, for the constitution of service messages. A first zone, shown at 6 in FIG. 3a, assembles:

keys indicating the nature of the message that is transmitted. This message may provide information on the fact that the object observed is the same in the previous message or that the message concerns a different object, keys of the "I see", "I hear" type, to indicate the nature of the observation, and keys to indicate the number of aircraft observed: one aircraft, two aircraft, three aircraft or a group of aircraft.

The keyboard also has keys to indicate the type of aircraft observed: these keys are shown in a zone 7 of FIG. 3a. The symbols used represent, in FIG. 3a either military aircraft or transport aircraft, helicopters, commercial aircraft, light civil aircraft or, again, various objects such as parachutes, balloons, ultra-light aircraft etc.

The zone referenced at 8 in FIG. 3A includes keys indicating the geographical place of observation. The corresponding keys are used in twos. The first key enables the position function to be chosen, and the second key enables this position to be indicated. In the example shown, there are nine choices possible: north, north-east, east, south-east, south, south-west, west, north-west and above.

The zone shown at 9 in FIG. 3a includes the keys indicating the direction taken by the aircraft observed. These keys are also used in twos. The first key enables the direction function to be chosen. The second key enables the indicating of the direction among the nine possible choices: north, north-east, east, south-east, south, south-west, west, north-west, vertical. The zone shown at 10 in FIG. 3a has the keys indicating the altitude of the aircraft from among four possible choices: zero, low, medium and high altitude The zone referenced 11 in FIG. 3a has keys indicating the distance of the aircraft from the observer, from among four possible choices: zero, near, mid-distance, far. The zone referenced 12 in FIG. 3b has the keys indicating the speed of the aircraft from among three possible choices: stopped, slow and fast. Finally, the zones 14 to 18 contain the keys and symbols that are needed to transmit service messages indicating, for example, that the reception is accurate or inaccurate, that there is a danger, that the execution of a received order is being confirmed or that the received order has not been carried out.

Pressing the keys 5 of the keyboard of the keyboard of FIG. 2 makes it possible, as desired, to compose any message liable to provide information on the nature, position and speed of any aircraft moving in the scene observed. An example of the composition of these messages is shown in FIG. 4 where it can be read, in the sequence of symbols used, that the message concerns an observation different from the previous observation, that the operator is seeing the scene before him, that this scene includes three military aircraft coming from the north and going eastwards with a medium altitude, in the mid-distance and at low speed.

The message of FIG. 4 is recorded while it is composed on a screen 19 of the terminal shown in FIG. 2. It is received and recorded in the manner shown in FIG. 5, inside one or more windows 20, 40 of a display screen (reference number 35 of FIG. 7) of a graphic station 21 installed in the control center 2 of FIG. 1. Windows 20, 40 might alternatively or simultaneously represent the incoming message in symbolic graphics, as shown in window 20, or in theater recreation graphics, as shown in window 40, or in other graphical forms appropriate to the planned use of the system.

Figure 6:
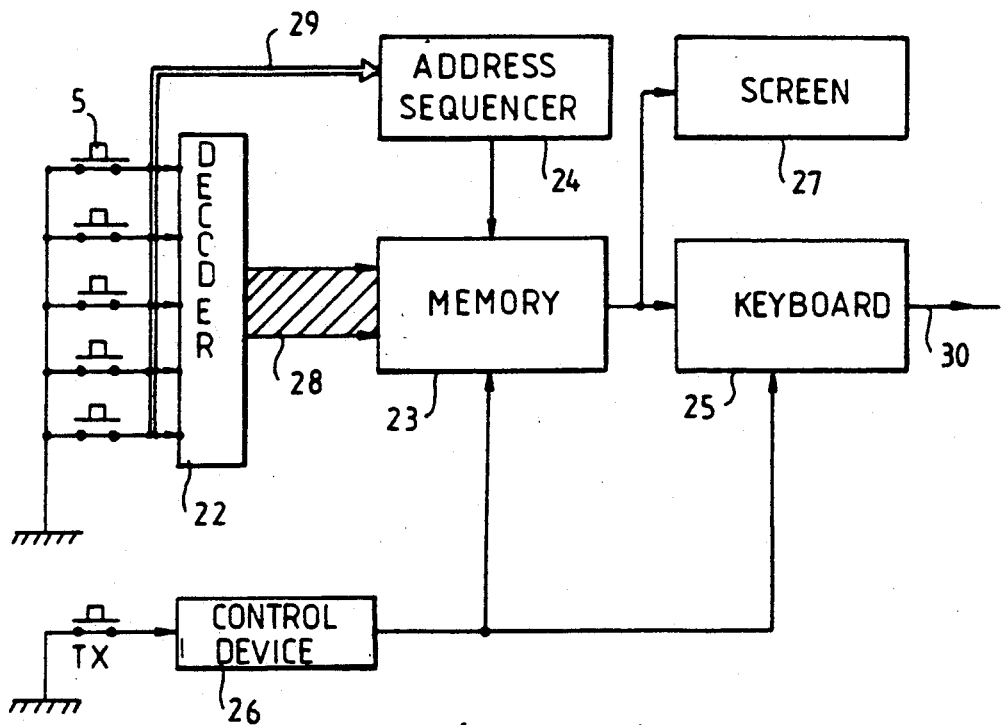
FIG. 6 shows an embodiment of a terminal forming part of the system shown in FIG. 1.
Figure 7:
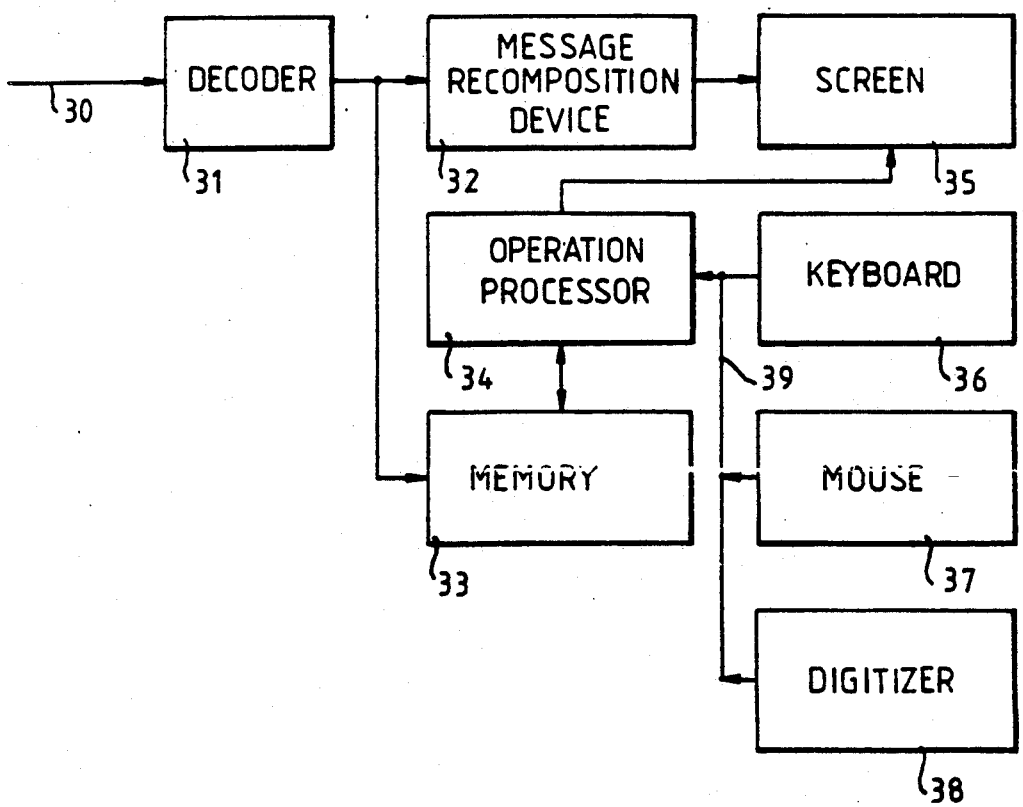
FIG. 7 shows an embodiment of the control station forming part of the system shown in FIG. 1.

An exemplary embodiment of a terminal 1 is shown in FIG. 6. In addition to the keys 5, it has a decoder 22, a random-access memory 23, a address sequencer 24, a transmission encoder 25, a control device 26 and a screen 19. The symbols selected by the keys 5 of the keyboard 4 are applied after encoding by the decoder 22 to a data bus 28 connected to the memory 23. Each pressing of a key triggers, on a control bus 29 connected to the address sequencer 24, a cycle for writing the data flowing in the bus 28 inside the random-access memory 23. It also triggers a memory 23 reading cycle to make symbols stored in the memory 23 appear on the screen 19. The memory 23 is also connected to a transmission encoder 25 to make a transmission, by the action of the key TX of the keyboard of FIG. 2, of each message composed inside the memory 23, this transmission being made on a link 30 going to the control center 2. The control center 2, which is shown in FIG. 7, has a symbol decoder 31, a message recomposition device 32, formed by a microprocessor or any equivalent device, a random-access memory 33, an operation processor 34, a screen 35, a keyboard 36, a mouse 37 and a digitizer 38. The symbols transmitted by a terminal 1 are applied to the input of the decoder 31 by the link 30. They are applied, firstly, to the input of the message recomposition device 32 and, secondly, to the data input of the memory 33. The set formed by the keyboard 36, the mouse 37 and the digitizer 38 is connected by a data bus 39 to an operation processor 34. The operation processor 34 is connected, firstly, to the memory 33 and, secondly, to the screen 35. The processor 34 enables the recording of the data flowing through the data bus 39 or coming from the decoder 31 into the memory 33, and the display of this data on the screen 35. The set of elements formed by the keyboard 36, the mouse 37 and the digitizer provides for the interface between the operator and the operation processor 34. It notably enables the operator of the control center to initialize the system by introducing the map of the field of operations into the memory 34 by means of the digitizer 38, and by introducing, through the mouse 37 and the keyboard 36, the positions of the observers on the operational map as a function of their real geographical position on the ground, each observer being identified, for example, by a specific code enabling him to be in communication with the control center.

Figure 5:
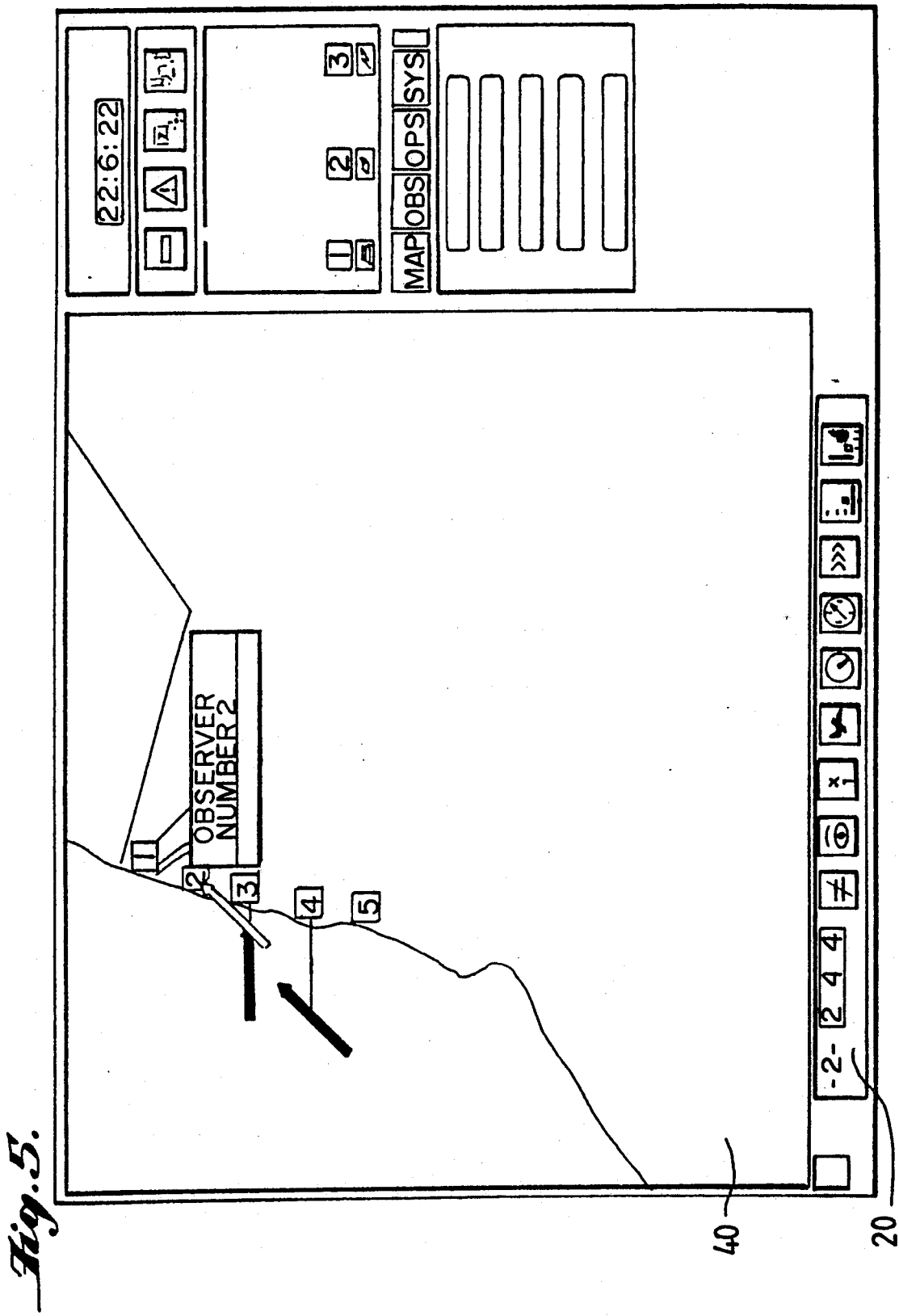
FIG. 5 shows an example of the restoring of a scene observed on the screen of the graphic console of the control device shown in FIG. 1.

During operation, the messages received are, as shown in FIG. 5, displayed in their symbolic form as and when they arrive in the window 20. The recomposition device 34 is suitably programmed to provide for the routine display of information pre-determined so that the observer of the control center is presented with a unified view of the movements of the different moving bodies observed by observers in the field of operations. These movements are identified in FIG. 5 by vectors for which the directions and the distances with respect to the observers are computed by the message recomposition device 32 on the basis of the information on direction and distance forming the corresponding fields of the messages. Furthermore, the operation processor 31 also gives the operator the possibility of performing subsequent operations on symbolic messages received by the systems and, notably, it enables the performance of sorting, selection and cancellation operations and, generally, any operation capable of helping the operator in his operational tasks.

What is claimed is:

1. A method for the digital tranmission and recording of digitally encoded operational messages comprising the steps of:

selecting, among symbols or ideograms representing actions or objects occurring in a theater of operations, those capable of providing information on the status of determined situations observed in the theater of operations, composing the messages according to different fields each containing a symbol to juxtapose the selected symbols in a suitable order to describe each type of observed situation, each of said messages having at least one first field to indicate that the objects observed are identical to or different from those of the previous message, a second field to indicate that the observer sees or hears the objects move in the theater of operations, a third field to indicate the number of objects observed, a fourth filed to indicate the nature of the objects observed, a fifth field to indicate the direction from which the objects observed are coming, a sixth field to indicate the direction in which the objects are going, a seventh field to indicate the altitude of the objects observed, an eighth field to indicate the distance, with respect to the observer, of the objects observed, and a ninth field to indicate the speed of the objects observed.

almost simultaneously encoding and transmitting each composed message, it being possible for each message to be transmitted at any instant, irrespectively of the status of information provided by the different fields consti.uting the message and irrespectively of the order in which the information is provided.

2. A method according to claim 1, wherein the messages transmitted are recorded and then recomposed to represent, on a display instrument, a unified view of the movements of the various objects on the scene of the theater of operations.

3. A method according to claim 2, wherein the movements are represented by vectors for which the directions and distances with respect to the observers are determined on the basis of the fields of direction and distance contained in the messages.

4. A device for the implementation of the method according to any one of the claims 1,3 or 4 comprising at least one message transmitter connected to a control center by a transmission medium, each transmitter having a keyboard formed by keys, each assigned to at least one symbol or ideogram to be transmitted and coupled to a transmission encoder to apply each selected symbol or ideogram to the keyboard, on the transmission medium, towards the control center, the control center including a message decoder coupled to a display screen and an operation processor to record each transmitted message on the screen.

5. A device according to claim 4, wherein the operation processor is connected to information input/output devices enabling the display of the map of the theater of operations and of the position of the observers on the map.

6. A device according to claim 5, wherein the control center includes a message recomposition device to enable depictions, on the map and in vector form, of the movements of the objects observed in the field of operations.

* * * * *